(12) United States Patent
McGowan et al.

(10) Patent No.: US 11,337,414 B2
(45) Date of Patent: May 24, 2022

(54) INSECT TRAP AND METHOD

(71) Applicant: Killgerm Group Limited, Yorkshire (GB)

(72) Inventors: Neil McGowan, Yorkshire (GB); Zaphod Leigh, Yorkshire (GB)

(73) Assignee: KILLGERM GROUP LIMITED, Yorkshire (GB)

( * ) Notice: Subject to any disclaimer, the term of this patent is extended or adjusted under 35 U.S.C. 154(b) by 291 days.

(21) Appl. No.: 16/347,797

(22) PCT Filed: Nov. 3, 2017

(86) PCT No.: PCT/GB2017/053315
§ 371 (c)(1),
(2) Date: May 6, 2019

(87) PCT Pub. No.: WO2018/134550
PCT Pub. Date: Jul. 26, 2018

(65) Prior Publication Data
US 2019/0350185 A1 Nov. 21, 2019

(30) Foreign Application Priority Data

Jan. 19, 2017 (GB) ..................................... 1700921

(51) Int. Cl.
*A01M 1/14* (2006.01)
*A01M 1/10* (2006.01)
(Continued)

(52) U.S. Cl.
CPC ............ *A01M 1/145* (2013.01); *A01M 1/026* (2013.01); *A01M 1/10* (2013.01); *G02B 13/06* (2013.01);
(Continued)

(58) Field of Classification Search
CPC ............................. A01M 1/026; A01M 1/145
(Continued)

(56) References Cited

U.S. PATENT DOCUMENTS

| 7,937,887 | B2* | 5/2011 | Child | A01M 1/08 |
| | | | | 43/139 |
| 8,400,348 | B1* | 3/2013 | Guice | G01S 7/414 |
| | | | | 342/54 |

(Continued)

FOREIGN PATENT DOCUMENTS

| CN | 103914733 | 7/2014 |
| CN | 303951264 | 11/2016 |

(Continued)

OTHER PUBLICATIONS 17795032.6, Examination Report, dated Nov. 12, 2020, 6 pages.
PCT/GB2017/053315, International Search Report and Written Opinion, dated Jun. 5, 2018, 12 pages.

*Primary Examiner* — Brady W Frazier
*Assistant Examiner* — Jodutt Basrawi
(74) *Attorney, Agent, or Firm* — Stoel Rives LLP

(57) ABSTRACT

An insect trap and a method of using the same. The insect trap includes a housing. The insect trap also includes a glue board receiving space located inside the housing. The insect trap further includes one or more light sources for attracting insects into the housing. The insect trap also includes a camera having a lens. The lens has a front element. The camera is positioned to capture images of a glue board when the glue board is received in the glue board receiving space. There is no line of sight between the or each light source and the front element of the lens. This may prevent light from the or each light source reaching the front element directly. The method can include using an image captured by the camera (Continued)

to determine that a glue board received in the glue board receiving space needs to be replaced.

15 Claims, 6 Drawing Sheets

(51) Int. Cl.
*G02B 13/06* (2006.01)
*G03B 15/03* (2021.01)
*A01M 1/02* (2006.01)

(52) U.S. Cl.
CPC ...... *G03B 15/03* (2013.01); *G03B 2215/0514* (2013.01); *G03B 2215/0564* (2013.01); *G03B 2215/0567* (2013.01)

(58) Field of Classification Search
USPC .......................................................... 43/113
See application file for complete search history.

(56) References Cited

U.S. PATENT DOCUMENTS

| | | | |
|---|---|---|---|
| 9,933,351 B2 * | 4/2018 | Kent | G01N 15/0612 |
| 10,104,879 B2 * | 10/2018 | McGowan | A01M 1/223 |
| 10,568,314 B2 * | 2/2020 | Sandford | A01M 1/145 |
| 2002/0139040 A1 * | 10/2002 | Burrows | A01M 1/145 43/113 |
| 2005/0025357 A1 | 2/2005 | Landwehr et al. | |
| 2007/0169401 A1 * | 7/2007 | Chyun | A01M 1/145 43/113 |
| 2010/0115826 A1 | 5/2010 | Kerr | |
| 2013/0312314 A1 * | 11/2013 | Greening | A01M 1/023 43/114 |
| 2016/0245916 A1 * | 8/2016 | Weber-Grabau | G01B 11/08 |
| 2017/0290318 A1 * | 10/2017 | Bergengren | A01M 1/023 |

FOREIGN PATENT DOCUMENTS

| | | | | |
|---|---|---|---|---|
| EP | 2149301 A1 | | 2/2010 | |
| JP | 2003169584 A | | 6/2003 | |
| JP | 2008259448 A | | 10/2008 | |
| JP | 2009072131 A | | 4/2009 | |
| JP | 5331760 B2 * | | 10/2013 | ............ A01M 1/026 |
| JP | 2013236586 A | | 11/2013 | |
| JP | 5812321 B2 * | | 11/2015 | ............ A01M 1/026 |
| KR | 20080006034 U * | | 12/2008 | ............ A01G 22/00 |
| SI | 23715 * | | 11/2012 | ............ A01M 1/00 |
| WO | 2014107797 A1 | | 7/2014 | |
| WO | 2014125158 A1 | | 8/2014 | |
| WO | 2016045002 A1 | | 3/2016 | |
| WO | WO-2017066513 A1 * | | 4/2017 | ............ A01G 22/00 |

* cited by examiner

INSECT TRAP AND METHOD

FIELD OF THE INVENTION

This invention relates to an insect trap and to a method of using an insect trap.

BACKGROUND OF THE INVENTION

Known insect traps typically use UV light having a wavelength of approximately 368 nm to attract insects onto an insect disabling portion such as a glue board or a high voltage killing grid provided within a housing.

When a glue board is used, the glue board needs to be replaced periodically, as it dries out and/or becomes covered with captured insects. It is difficult to predict how long a glue board may last for before it needs to be replaced. It is known to use a camera to take images for determining the capture of insects in an insect trap. It is also known to use images of this kind to determine the number and kind of insects that have been caught.

JP 2013 236586 describes an insect capturing device that includes an insect-attracting light in an insect capturing case for attracting an insect having an opening, and an adhesive sheet for adhering and capturing the insect attracted by the light of the insect-attracting light. A plurality of CCD cameras capable of photographing exposed parts of an upper surface of the adhesive sheet are arranged to face the adhesive sheet so that a part not included in a photographing regions of the CCD cameras out of the exposed part is eliminated.

EP 2 149 301 describes a method and device for the automated registering of insects present on a catch plate. The catch plate is introduced into a device and scanning of the catch plate is carried out with the aid of a camera and light. The presence of insects, like the number of insects, is determined based on vision technologies. Optionally with the intervention of a remotely positioned central processing unit, a signal is issued, based thereon, if a threshold value is exceeded. Based thereon, it is possible to take measures, in for example a growing space where the catch plates are positioned, in order to counteract undesirable phenomena.

US 2006/215885 describes systems and methods for detecting presence and movement of pests. A pest detection system can be based on, for example, a beam-interrupt detector or a thermal imaging device. The beam-interrupt detection based system can provide functionalities such as counting of pests crossing a given beam. A plurality of such beams at different heights can also allow distinguishing different sized pests. The thermal imaging based detection system can provide functionalities such as tracking movement of pests. A recording can be triggered by detection of pest movement, thereby improving the efficiency of recording and reviewing information indicative of presence and movement of pests in a monitored area. Movement of pests can be monitored on a passive basis, or by providing a stimulus that induces movement.

WO 2014/125158 describes a method and an apparatus for imaging arthropods. In the method an arthropod is detected. The arthropod may be illuminated when necessary. The method further comprises providing at least a first view to at least a part of the arthropod, providing a second view to the arthropod, and capturing at least one image of at least the first view and a second view of the arthropod. The apparatus comprises means for detecting an arthropod; means for providing a first view to at least a part of the arthropod and means for capturing an image of at least the first view and a second view of the arthropod.

JP 2003 169584 describes a noxious insect trap that has a supplying roll winding an adhesive sheet for capturing the noxious insects, a winding roll for winding up the adhesive sheet drawn out from the supplying roll, an insect trap part for extending the adhesive sheet between the supplying roll and winding up roll and a trapped insect analyzing part for performing the counting of the number of trapped insects on the adhesive sheet and/or identification of their kinds. The trapped insect-analyzing part is constituted by having a picture-taking part for taking the pictures of transmitted light of the trapped insects by the adhesive sheet and the analyzing part for performing the counting of the number of the insects and/or the identification of their kinds from image information obtained by the picture-taking part 70.

JP 2009 072131 describes an insect catcher that comprises a means for attracting outside insects thereinto inside a long-length casing with openings, via which insects can intrude thereinto and a holder capable of holding a strip of insect-catching sheet provided with a tacky surface for catching insects the casing in the longitudinal direction. This insect catcher is characterized by being equipped with a photographer movable along the insect-catching sheet in the longitudinal direction to enable the whole length of the insect-catching sheet X to be photographed.

JP 2008 259448 describes an insect trap including an insect-attracting light, which is arranged in the depth direction of an opening part through which insects come in and out; a prescribed insect-trapping space for trapping the insects is formed therebetween. The adhesive sheet is arranged at the lower side of the insect-trapping space, and the image-taking means for taking the image of the insects attached to the adhesive sheet by facing thereto is arranged at the upper side and constituted so as to be able to move reciprocatingly along the longitudinal direction of the sheet surface.

JP 2013 236586 describes an insect capturing device that includes an insect-attracting light in an insect capturing case for attracting an insect having an opening, and an adhesive sheet for adhering and capturing the insect attracted by the light of the insect-attracting tight. A plurality of CCD cameras capable of photographing exposed parts of an upper surface of the adhesive sheet are arranged to face the adhesive sheet so that a part not included in a photographing regions of the CDC cameras out of the exposed part is eliminated.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided an insect trap comprising:
 a housing;
 a glue board receiving space located inside the housing;
 one or more light sources for attracting insects into the housing; and
 a camera having a lens with a focal length in the range 1 mm≤f≤18 mm, the lens having a front element, wherein the camera is positioned to capture images of a glue board when said glue board is received in the glue board receiving space, wherein the light received by the lens of the camera for capturing images of the glue board comprises light from the one or more light sources reflected from the glue board;

wherein there is no line of sight between the or each light source and the front element of the lens, for preventing light from the or each light source reaching the front element directly.

The focal length of the lens, in the range 1 mm≤f≤18 mm, can allow the lens to be placed close to the glue board (for reducing the physical size of the trap). Wide angle lenses may be particularly susceptible to lens flare. Since light from the or each light source cannot reach the front element of the lens directly, lens flare in images captured by the camera may be prevented. This can improve the quality of the images captured by the camera.

The improved quality of the images may allow a more accurate determination to be made as to the status of the glue board. For instance, an improved determination may be made as to whether a glue board received in the glue board receiving space needs to be replaced or not.

The camera may be generally fixed in position with respect to the glue board receiving space and a glue board received in the glue board receiving space.

The or each light source may be located a greater distance away from the glue board receiving space, along a direction substantially parallel to an optical axis of the lens, than a front surface of the front element of the lens. By positioning the or each light source behind the camera in this way, it may be ensured that there is no line of sight between the or each light source and the front element of the lens, without necessarily having to take any further measures to prevent lens flare (e.g. providing a hood for the lens). Additionally, it is noted that placing the light source(s) further away from the glue board receiving space may generally lead to less intense reflections from the glue board itself, which can help to prevent glare in the images of the glue board captured by the camera.

A surface may be located inside the housing, which faces the glue board receiving space. The lens of the camera may be mounted in an opening in the surface. The surface may be the surface of an enclosure containing the camera and one or more further electronic components of the insect trap. The or each light source may be located outside the enclosure. In this way, the enclosure may shield the camera and/or further electronic components of the trap from heat generated by the or each light source, while the opening in the surface can allow the lens access to capture images of a glue board received in the glue board receiving space. Note that in some examples, features of the enclosure may also serve to block any line of sight between the or each light source and the front element of the lens.

The glue board receiving space may substantially fill a field of view of the camera. In this way, the camera can capture images covering substantially all of a glue board received in the glue board receiving space.

An optical axis of the lens may be oriented substantially parallel to a surface normal of the glue board when the glue board is received in the glue board receiving space. This can help reduce perspective distortion in the captured images.

A distance between a front surface of the front element and the glue board receiving space, along an optical axis of the lens, may be in the range 50 mm≤d≤200 mm. In one example, the distance may be in range 70 mm≤d≤130 mm. In one particular example, the distance may be around 100 mm. By reducing the distance between the lens and a glue board received in the glue board receiving space, the insect trap may be made more compact. In one example, the lens may have a focal length in the range 2 mm≤f≤12 mm. In one particular example, the lens may have a focal length of around 2.1 mm. The lens may be a fisheye lens.

The or each light source may be a fluorescent tube. A longitudinal axis of the or each fluorescent tube may be oriented substantially parallel to a plane containing the glue board receiving space. This can allow the insect trap to be made compact while also ensuring that no part of the tube(s) is visible to the camera lens.

The or each light source may be a light emitting diode.

One or more surfaces located inside the housing may be anti-reflective surfaces. For instance, the surfaces may be coated with anti-reflective paint, or may be provided with some other form of matt coating. In one example, the surface(s) may be matt plastic surfaces. This can prevent lens flare arising from light reflected from surfaces within the trap reaching the front element.

The or each light source may be configured to emit ultraviolet light having a peak wavelength in the range 300 nm≤λ≤400 nm. For instance the peak wavelength may be around 368 nm. This wavelength is particularly effective at attracting insects.

According to another aspect of the invention, there is provided a method of using an insect trap of the kind set out above, the method comprising:

using an image captured by the camera to determine that a glue board received in the glue board receiving space needs to be replaced; and replacing the glue board.

Because of the above mentioned measures taken for reducing or preventing lens flare in images captured by the camera, the accuracy of the determinations as to whether a glue board received in the glue board receiving space needs to be replaced may be improved. This can prevent glue boards being left in the insect trap too long, or conversely being replaced too early.

BRIEF DESCRIPTION OF THE DRAWINGS

Embodiments of the present invention will be described hereinafter, by way of example only, with reference to the accompanying drawings in which like reference signs relate to like elements and in which.

DETAILED DESCRIPTION

Figure 1:
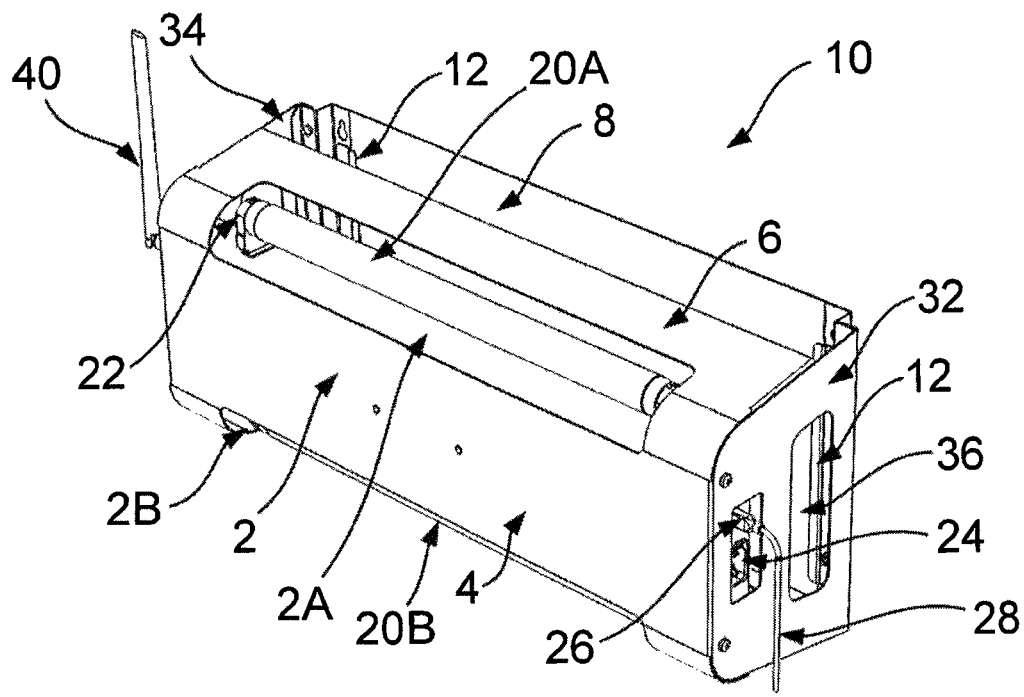
FIG. 1 shows a front isometric view of an insect trap according to an embodiment of the invention.
Figure 2:
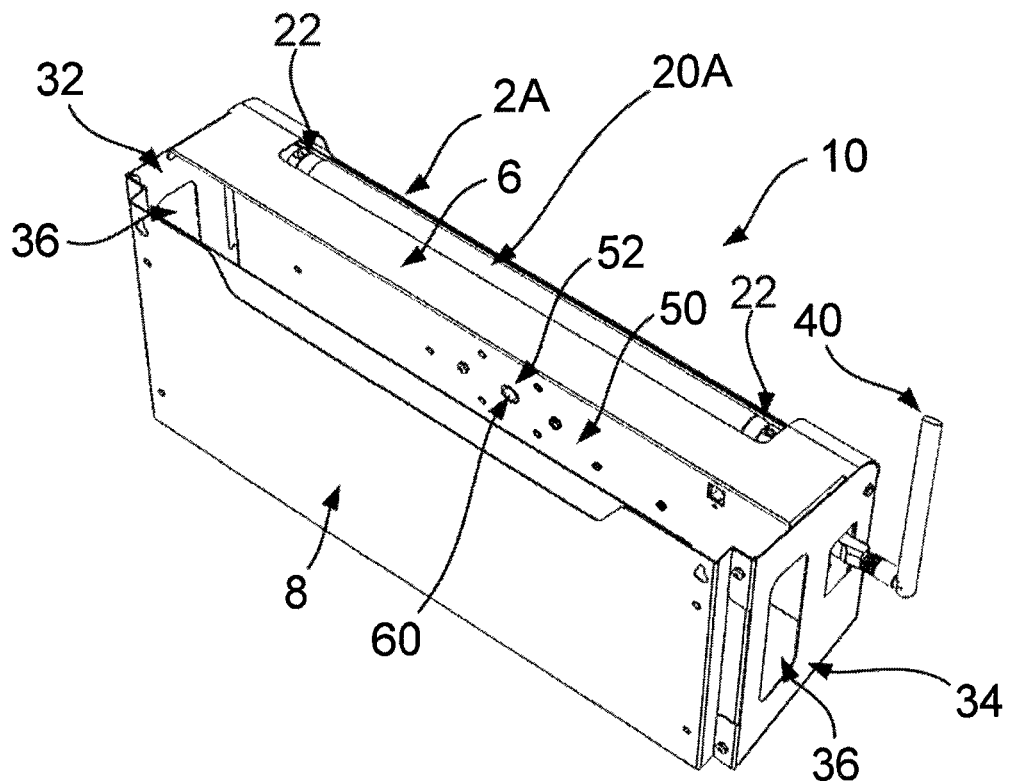
FIG. 2 shows a rear isometric view of the insect trap of FIG. 1, according to an embodiment of the invention.
Figure 3:
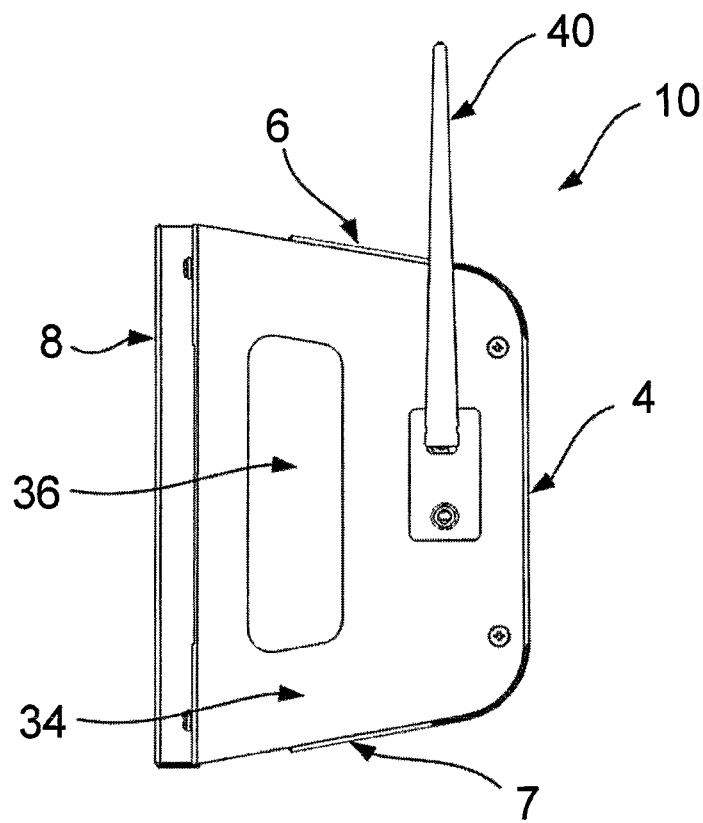
FIG. 3 shows a left side view of the insect trap of FIG. 1, according to an embodiment of the invention.
Figure 4:
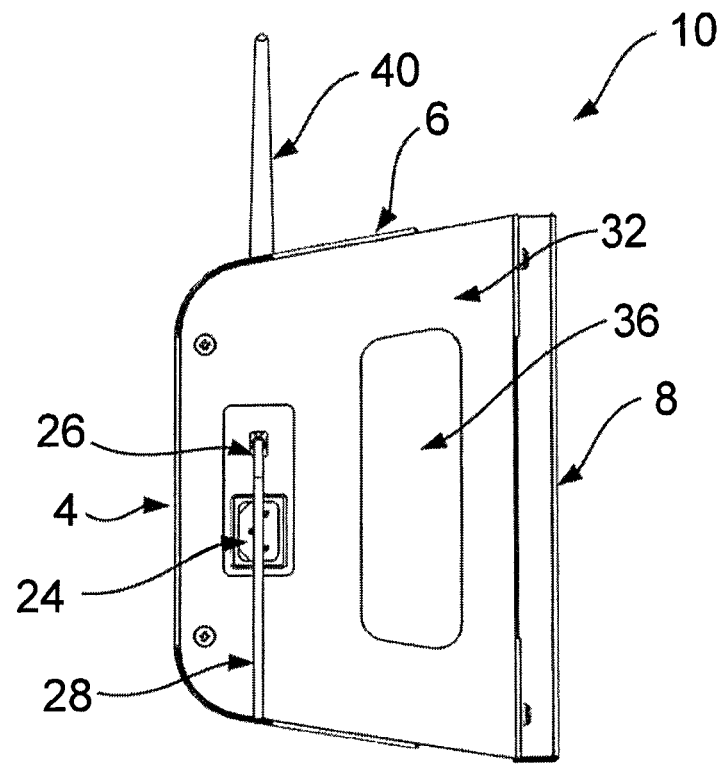
FIG. 4 shows a right side view of the insect trap of FIG. 1, according to an embodiment of the invention.
Figure 5:
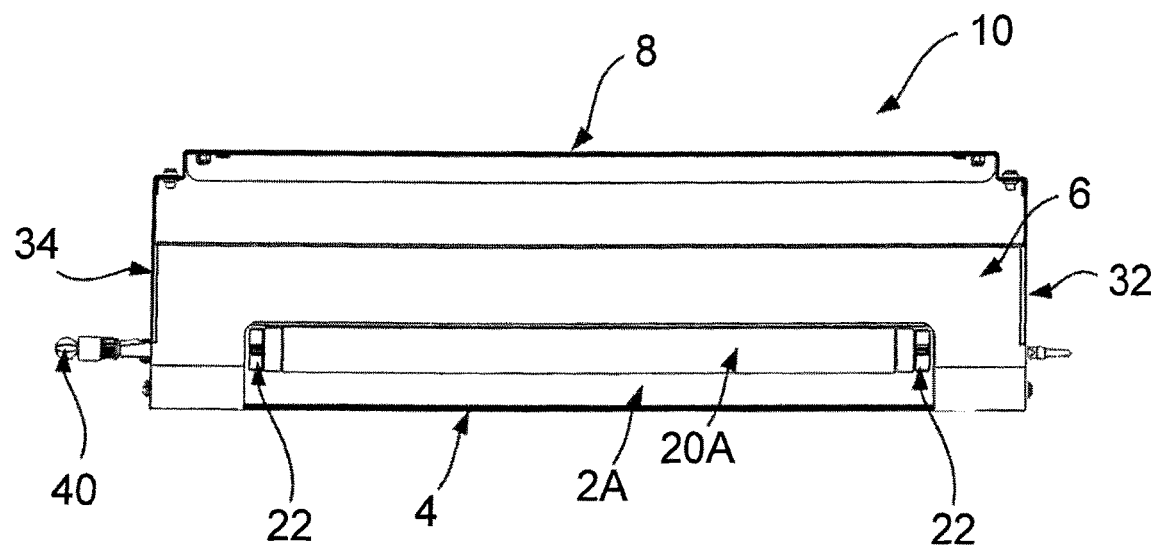
FIG. 5 shows a top side view of the insect trap of FIG. 1, according to an embodiment of the invention.
Figure 6:
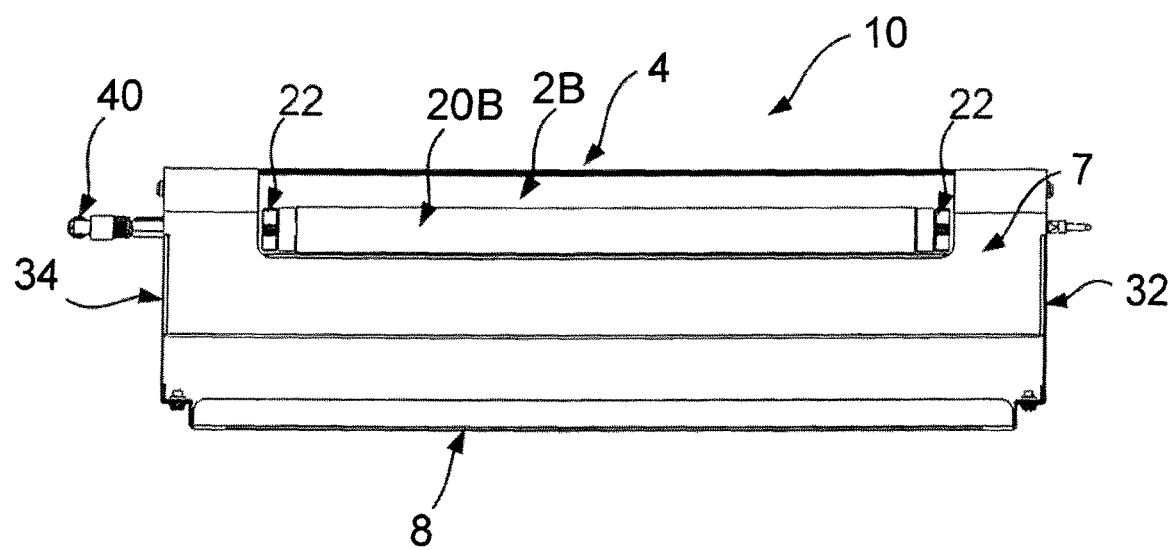
FIG. 6 shows a bottom side view of the insect trap of FIG. 1, according to an embodiment of the invention.
Figure 7:
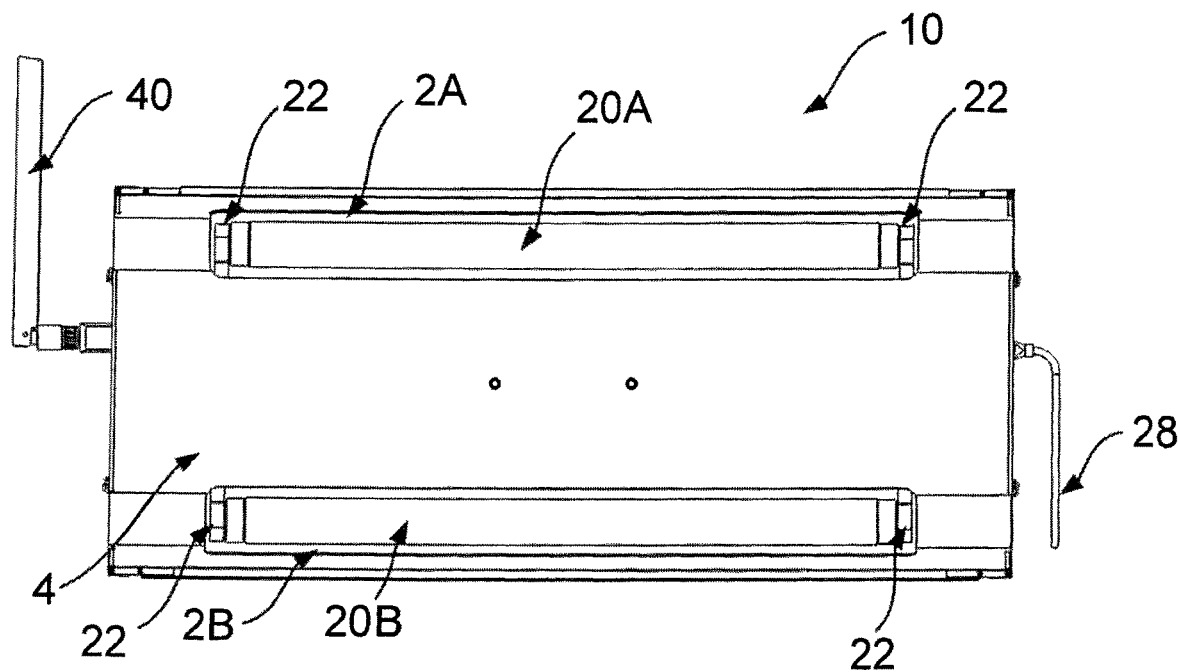
FIG. 7 shows a front side view of the insect trap of FIG. 1, according to an embodiment of the invention.
Figure 8:
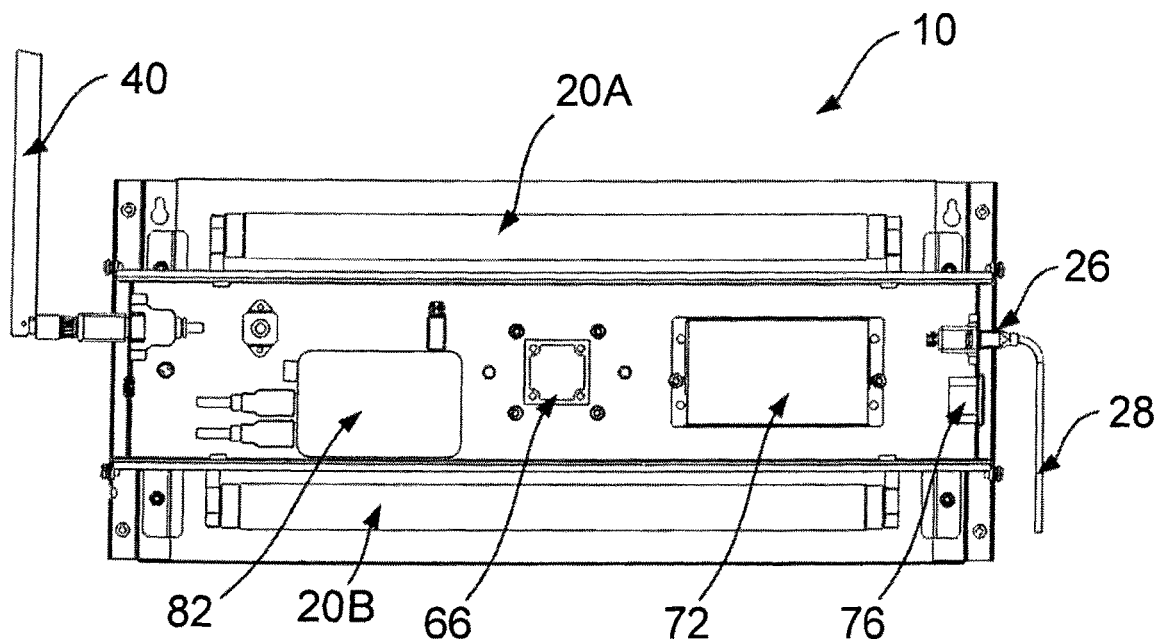
FIG. 8 shows a front side view (with the front cover removed) of the insect trap of FIG. 1, according to an embodiment of the invention.

Embodiments of the present invention are described in the following with reference to the accompanying drawings.

FIGS. 1 to 10 show various views of an insect trap 10 according to an embodiment of this invention.

The insect trap 10 in this example is suitable for use in a premises such as a factory, warehouse, restaurant or offices. The insect trap 10 in this example is wall mountable. It is also envisaged that a trap according to the present invention may be ceiling mounted, or may be free standing for placement on a surface such as the floor or on a table.

The insect trap includes a housing 10. The housing in this example includes a substantially flat rear cover plate 8. The rear cover plate 8 may be provided with one or more fixtures to facilitate the mounting of the insect trap 10 on a surface such as a wall.

The housing may also include a front cover 2. The front cover 2 in the present example includes a front portion 4 for covering the front of the insect trap (which faces outwardly, when the trap 10 is mounted on a wall). As shown particularly in FIG. 3, the front cover 2 may also include an upper portion 6 for covering an upper side of the trap 10 and a lower portion 7 for covering a lower side of the trap. Accordingly, the front cover 2 may be substantially C-shaped. The front portion 4, upper portion 6 and lower portion 7 may be integrally formed. As can be seen from FIGS. 1 and 2, there is a gap between the rear cover plate 8 and the upper portion 6, and another gap between the rear cover plate 8 and the lower portion 7. These gaps allow insects to enter the trap for immobilisation.

The housing may also include a first sidewall 32 and a second sidewall 34 opposite the first side wall. Each side wall 32, 34 may include one or more openings 36. The openings 36 may allow insects to enter the trap 10.

The various parts of the housing described above may, for instance, be formed from sheet metal (e.g. Zinc plated mild steel sheet), stamped and folded into the desired shape.

The insect trap 10 also includes a glue board receiving space. The glue board receiving space may be substantially planar for receiving a flat glue board. However, it is also envisaged that the glue board receiving space may in other examples be shaped to accommodate a non-flat glue board (e.g. a glue board including one or more folds).

In the present example, the glue board receiving space is defined by a surface of the rear cover plate 8 which faces the inside of the trap 10. This surface of the rear cover plate 8 may be provided with features for mounting the glue board. In the present example, the rear cover plate 8 is provided with opposing channels 12 located at either end thereof (e.g. adjacent the side sidewalls 32, 34 as shown in FIG. 1). The channels 12 can receive the edges of the glue board, for holding the glue board in place. When installed, a sticky surface of the glue board faces the inside of the trap 10 for immobilising insects that have entered the trap 10.

The insect trap 10 also includes one or more light sources. These light sources may, for example, be fluorescent tubes or light emitting diodes (LEDs). The light sources are configured to attract insects into the housing of the trap 10. As such, the light sources may be operable to emit light at wavelengths that are known to attract insects. In one example, the or each light source may be configured to emit ultraviolet light having a peak wavelength in the range 300 nm≤λ≤400 nm. For instance the peak wavelength may be around 368 nm. This wavelength is particularly effective at attracting insects.

Each light source may be located inside the housing. Each light source is positioned so that light emitted from it may illuminate a glue board received in the glue board receiving space. The front cover 2 may be provided with one or more openings 2A, 2B to allow light generated by the light sources to exit the housing for attracting insects. Insects may also enter the housing through these openings 2A, 2B. Furthermore, the openings 2A, 2B may allow heat generated by the light source(s) to leave the housing (e.g. by radiation and by air convection).

In the present example, the insect trap 10 is provided with two light sources, each light source comprising a fluorescent tube 20A, 20B. A first of the fluorescent tubes 20A in this example is located adjacent the front portion 4 and upper portion 6 of the front cover 2 (e.g. at a corner joining these two parts), while a second of the fluorescent tubes 20B in this example is located adjacent the front portion 4 and lower portion 7 of the front cover 2 (e.g. at a corner joining these two parts). As can be seen in FIG. 1, a longitudinal axis of each fluorescent tube 20A, 20B in this example is oriented substantially parallel to a plane containing the glue board receiving space defined by the surface of the rear cover plate 8. The insect trap includes electrical connectors 22 for supplying power to the terminals of each fluorescent tube 20A, 20B. The connectors 22 may be mounted on outer surfaces of the enclosure 80 to be described below.

As a glue board installed within the trap 10 increases in age, the number of insects immobilised on it may increase, to the point at which the glue board becomes too full to be fully effective for capturing further insects. At this point the glue board may be replaced with a fresh one.

The insect trap 10 also includes a camera 66. The camera 66 may be used to capture images of a glue board that is received in the glue board receiving space. These images may be used to inspect the glue board e.g. to determine whether the glue board needs to be replaced.

The camera 66 has a lens, which faces the glue board receiving space to allow the camera to capture images of the glue board. The lens has a front element 60. In the present example, the camera 66 is mounted in an enclosure 80 located inside the housing of the insect trap 10.

The enclosure 80 in this example is substantially box-shaped (e.g. rectangular cuboid shaped) and includes a number of sidewalls. The enclosure 80 in this example is located at the front of the housing of the insect trap 10, distal the rear cover plate 8. Note that the fluorescent tubes 20A, 20B may be located around the edges of the enclosure. For instance, in the present example, the fluorescent tube 20A is located above the enclosure 80, while the fluorescent tube 20B is located below the enclosure 80.

One of the sidewalls of the enclosure 80 has an outer surface 50, which faces the glue board receiving space. In the present example, the outer surface 50 is substantially planar, and is parallel the inwardly facing surface of the rear cover plate 8. The outer surface 50 of the enclosure 80 includes an opening 52. The lens of the camera 66 is mounted in the opening 52. In this way, the camera 66 may be located inside the enclosure 80 while still being able to capture images of the glue board. The lens may substantially fill the opening 52.

The insect trap may also include a control module 82. The control module may be located inside the enclosure 80 along with the camera 66. The control module 82 can serve to control the operation of the camera to capture, store and distribute images of the glue board. The control module may include features such as a processor, memory and one or more I/O ports for implementing these functions.

The insect trap 10 may further include electronic ballast 72 for the fluorescent tubes 20A, 20B. The electronic ballast 72 may also be located inside the enclosure 80.

Figure 9:
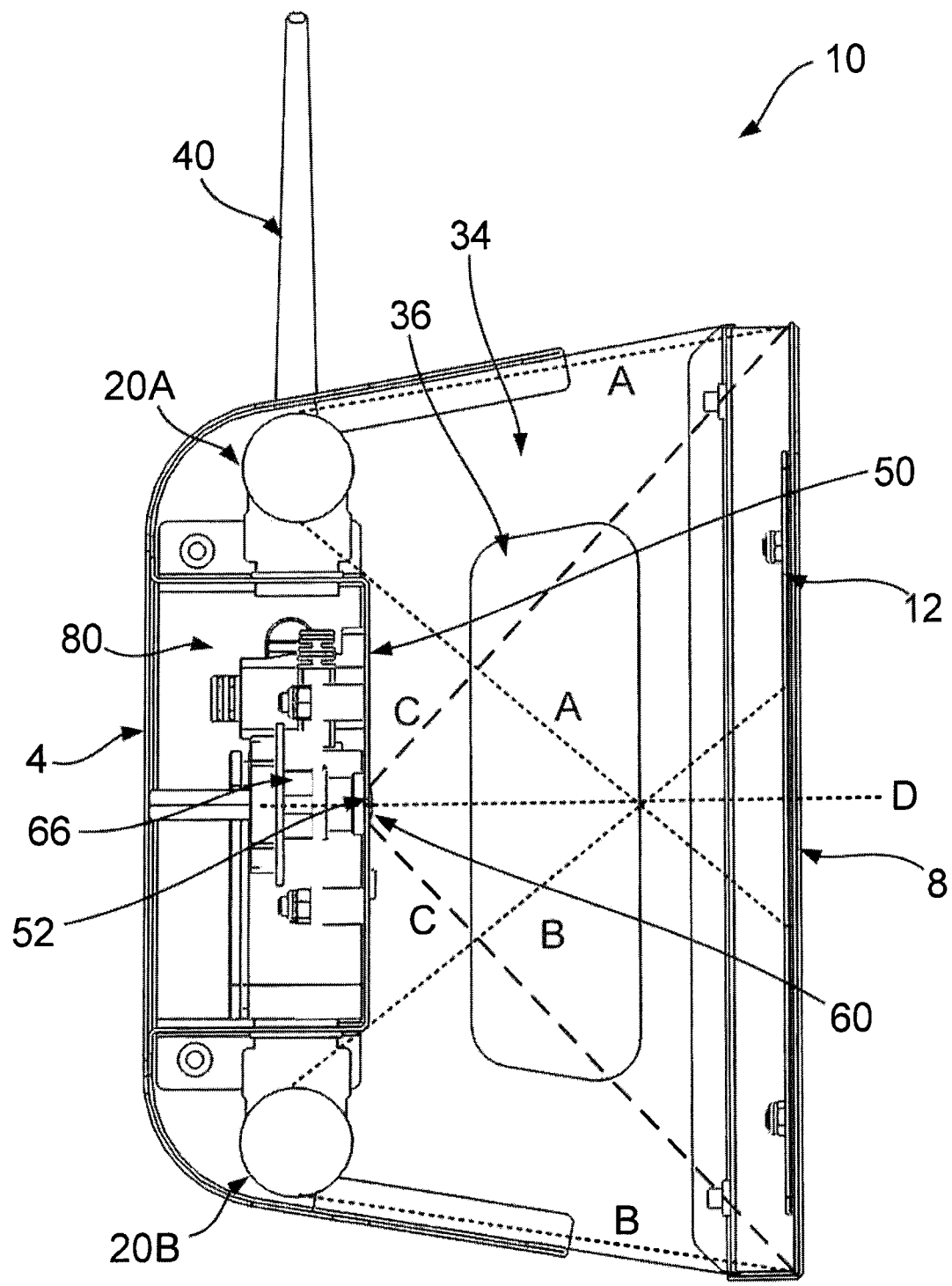
FIG. 9 shows cross section of the insect trap of FIG. 1, according to an embodiment of the invention.
Figure 10:
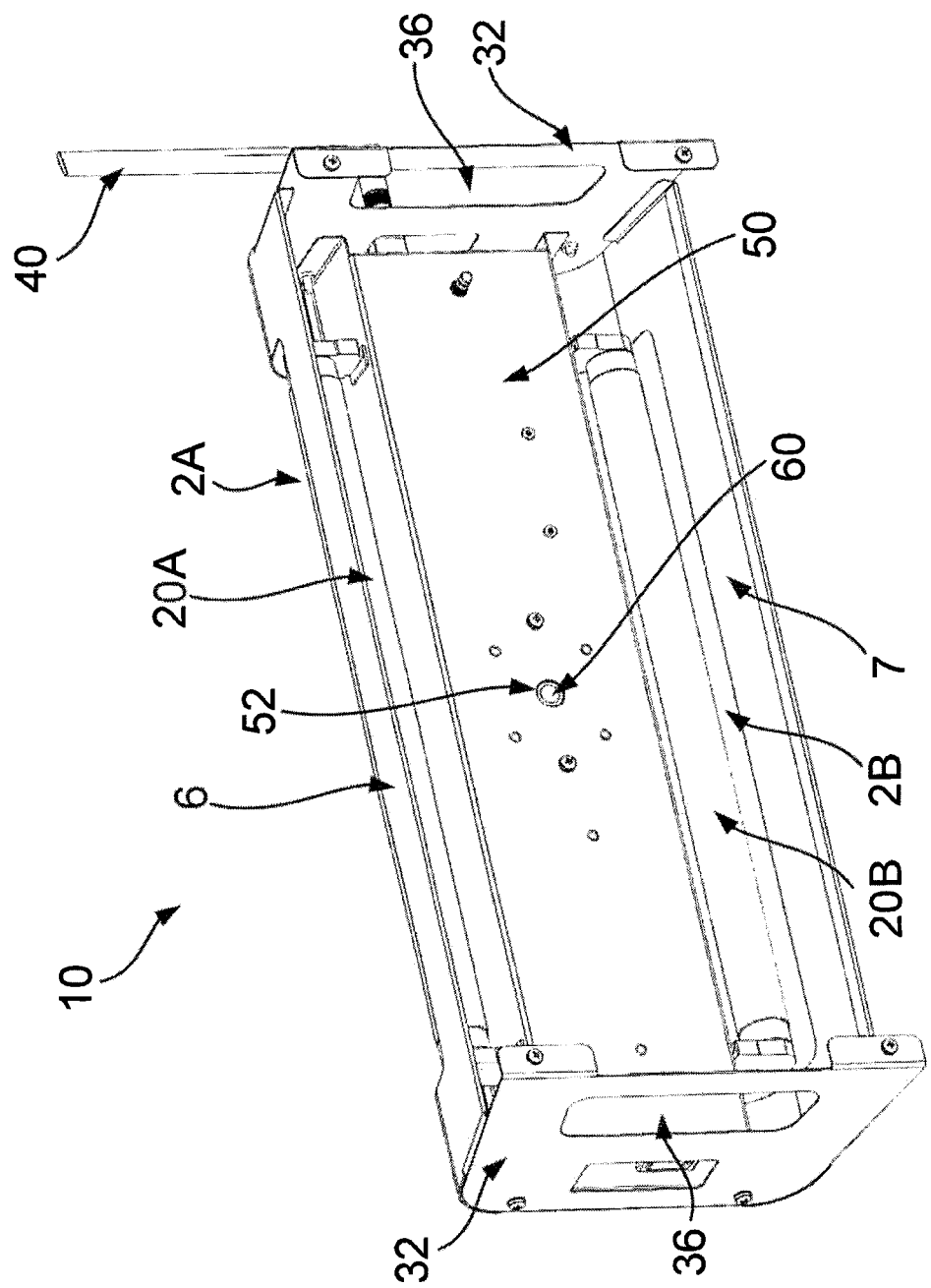
FIG. 10 shows a rear isometric view (with the rear cover plate removed) of the insect trap of FIG. 1, according to an embodiment of the invention.

Note that the enclosure 80 can provide physical protection (e.g. against mechanical shock or the ingress of dust etc.) for the components of the insect trap 10 such as the camera 66, control module 82 and the electronic ballast 72, while also shielding these components to some extent against the heat produced by the light source(s). As can be seen in FIG. 9, the lights sources are typically located outside the enclosure 80.

The insect trap may include one or more sockets 24 for receiving power connections such as plugs 26 and cables 28. This may allow the insect trap 10 to be connected to a mains power supply. In the present example, the socket(s) 24 are located outside the enclosure 80, on one of the sidewalls 32 of the housing.

The insect trap 10 may also include an antenna 40. The antenna may allow the insect trap 10 (in particular, the control module 82 thereof) to connect wirelessly to a local network and/or the internet. This may allow the insect trap 10 to be controlled/configured remotely, and may also allow the insect trap 10 to transmit the images captured by the camera 66 to a server. These images may then be used to monitor the status of the insect trap.

It is envisaged that the images captured by the camera 66 may be processed either at the server or locally at the trap 10 itself in order to determine whether the glue board needs to be replaced. This may prevent the glue board from being replaced too early, reducing the costs for maintaining the trap. It may also prevent delays in replacing the glue board after it has become too full to continue to immobilise insects effectively.

In order to allow effective processing of the images as described above, it is desirable that the images captured by the camera 66 are substantially free from artifacts and are a good representation of the actual appearance of the glue board.

An example of an artifact that may inhibit correct evaluation of the status of the glue board using the captured image is lens flare. Lens flare is generally associated with the presence of a bright light source. In the context of an insect trap 10 that includes one or more light sources and a camera 66 located in an enclosed space such as the housing, it will be appreciated that lens flare may well be problematic.

Lens flare may be caused by the scattering of light by multiple glass surfaces located in a lens. Lenses that include multiple lens elements are particularly prone to lens flare, as the number of surfaces available in the lens for scattering increases with an increasing number of lens elements that are included. It is noted that wide angle lenses may generally be more prone to lens flare owing to their large field of view.

Lens flare can degrade the captured images in two ways. Firstly, there may be a general reduction in contrast in the images that are produced (often referred to as haze in the image). Secondly, lens flare may give rise to more specific artifacts, usually in the shape of the lens iris, which may be formed when light follows a pathway through the lens that contains one or more reflections from the lens surfaces.

The camera 66 is generally fixed in position with respect to the glue board/glue board receiving space (by which it is meant that the camera 66 is not configured to scan along different parts of the glue board for capturing multiple image(s) of different parts of the glue board (e.g. for use in a composite image)). The camera 66 may be operable to capture individual images that each cover substantially all of a glue board received in the glue board receiving space. For instance, the glue board receiving space may substantially fill a field of view of the camera 66. Because of this, there is no need to provide complicated and expensive components in the insect trap 10 for implementing the use of a camera that scans the glue board (e.g. to produce a composite image).

In order to keep the size of the insect trap 10 compact, it may be generally desirable to locate the camera 66 as close to the glue board receiving space as is practical. For instance, it is envisaged that a distance between a front surface of the front element 60 of the lens and the glue board receiving space, along an optical axis of the lens, may be in the range 50 mm≤d≤200 mm. In one example, the distance may be in range 70 mm≤d≤130 mm. In one particular example, the distance may be around 100 mm. In view of this, it is anticipated that the lens itself may need to have a relatively wide field of view, in order that the images captured by the camera can cover substantially all of the glue board. The lens has a focal length in the range 1 mm≤f≤18 mm. In one example, the lens may have a focal length in the range 2 mm≤f≤12 mm. In one particular example, the lens may have a focal length of around 2.1 mm. It is envisaged that the lens may be a fisheye lens. As noted above, lenses having a large field of view may generally be more prone to lens flare.

In accordance with embodiments of this invention, steps may be taken to reduce or eliminate lens flare in the images of the glue board captured by the camera 66.

In particular, in accordance with embodiments of this invention, there is no line of sight between the or each light source and the front element 60 of the lens of the camera 66. In this way, light from the or each light source can be prevented from reaching the front element 60 of the lens directly, and the light sources themselves may be kept out of the field of view of the camera 66. In accordance with embodiments of this invention, it envisaged that substantially all of the light received by the lens of the camera 66 may thus be light reflected by the surface of a glue board received in the glue board receiving space (as can be seen from the Figures, the camera 66 is located on the same side of the glue board receiving space as the one or more light sources 20A, 20B, so that the light received by the lens of the camera 66 for capturing images of a glue board received in the glue board receiving space comprises light from the one or more light sources 20A, 20B reflected from the glue board (e.g. as opposed to light that is transmitted through the glue board from a light source located on the opposite side of the glue board). This light would typically not be intense enough to produce lens flare. Although the images captured by the camera may include features of the trap other than the glue board (e.g. parts of the rear cover plate 8 and/or the channels 12), the light reflected from these parts may also not be intense enough to produce lens flare. As described below these parts may also be anti-reflective surfaces.

The cross section of FIG. 9 illustrates the lack of a line of sight between the fluorescent tubes 20A, 20B and the front element 60 of the lens 66 in the present example.

The approximate field of view of the camera 66 is represented by the dashed lines labelled C in FIG. 9. In this example, the focal length of the camera is chosen so that the images captured by the camera encompass substantially all of the rear cover plate 8, including the glue board receiving space defined between the channels 12.

As represented by the dotted lines labelled A and B in FIG. 9, in the present example the fluorescent tube 20A generally illuminates an upper part of the glue board received in the glue board receiving space, while the fluorescent tube 20B generally illuminates a lower part of the glue board received in the glue board receiving space. A central part of the glue board may be illuminated by both fluorescent tubes 20A, 20B. Note that each fluorescent tube 20A, 20B is located outside the field of view of the camera 66.

In FIG. 9, the optical axis of the lens is indicated by the dotted line labelled D. Note that in the present example, the optical axis D of the lens is oriented substantially parallel to a surface normal of the glue board received in the glue board receiving space. This alignment of the lens and the glue board can help reduce perspective distortion (another undesirable artifact) in the captured images.

In the present example, each fluorescent tube 20A, 20B is located further away from the glue board receiving space along a direction substantially parallel to an optical axis D, than a front surface of the front element 60 of the lens. By placing the light sources of the trap 10 behind the front surface of the front element 60 of the lens in this way, it may be ensured that the light sources are kept out of the field of view of the camera, thereby to prevent lens flare from occurring.

It is also envisaged that the front surface to the front element 60 of the lens may be recessed slightly within the opening 52 in the surface 50 of the enclosure 80. In this way, the edges of the opening 52 may act as a hood for the lens, again to assist in preventing lens flare. The lens may also (or instead) be provided with a separate hood.

As noted above, a longitudinal axis of each fluorescent tube 20A, 20B in this example is oriented substantially parallel to a plane containing the glue board receiving space defined by the surface of the rear cover plate 8. This orientation of the fluorescent tubes 20A, 20B can allow the insect trap 10 to be made compact while also ensuring that no part of the fluorescent tube 20A, 20B are visible to the camera.

Another measure that may be taken to prevent lens flare in images captured by the camera 66 may be to provide the light sources themselves with a shroud or hood. The shroud or hood may be configured (shaped and positioned) such that it does not inhibit light emitted by the light source from reaching the glue board. On the other hand, the shroud or hood may be configured (shaped and positioned) to prevent light emitted from the light sources reaching the front element of the lens directly. This approach may be particularly useful in traps in which the confined space of the housing makes it difficult to position the light source(s) outside the field of view of the camera.

A further measure that may be taken to prevent lens flare in images captured by the camera 66 may be to ensure that at least some of the internal surfaces of the housing of the trap 10 are anti-reflective surfaces. For instance, these surfaces may be coated with anti-reflective paint, or may be provided with some other form of matt coating. In one example, the surface(s) may be matt plastic surfaces. These surfaces may include the surface 50, the surfaces of the channels 12, the inner surfaces of sidewalls 32, 34, the inner surfaces of the upper portion 6 and the lower portion 7, and the inwardly facing surface of the rear cover plate 8. This can help to prevent stray light from the light sources unintentionally reaching the front element 60 of the lens by reflection from surfaces inside the housing.

Accordingly, there has been described an insect trap and a method of using the same. The insect trap includes a housing. The insect trap also includes a glue board receiving space located inside the housing. The insect trap further includes one or more light sources for attracting insects into the housing. The insect trap also includes a camera having a lens. The lens has a front element. The camera is positioned to capture images of a glue board when the glue board is received in the glue board receiving space. There is no line of sight between the or each light source and the front element of the lens. This may prevent light from the or each light source reaching the front element directly. The method can include using an image captured by the camera to determine that a glue board received in the glue board receiving space needs to be replaced.

Although particular embodiments of the invention have been described, it will be appreciated that many modifications/additions and/or substitutions may be made within the scope of the claimed invention.

The invention claimed is:

1. An insect trap comprising:
a housing;
a glue board receiving space located inside the housing;
a first light source and a second light source for attracting insects into the housing; and
a camera having a lens with a focal length in the range 1 mm≤f≤18 mm,
the lens having a front element, wherein the camera is positioned to capture images of a glue board when said glue board is received in the glue board receiving space, wherein the light received by the lens of the camera for capturing images of the glue board comprises light from the first and second light sources reflected from the glue board;
wherein there is no line of sight between each of the first and second light sources and the front element of the lens, for preventing light from each of the first and second light sources from reaching the front element directly;
wherein the first light source is configured to illuminate a first portion of the glue board, the second light source is configured to illuminate a second portion of the glue board separate from the first portion, and the first and second light sources are configured to simultaneously illuminate a third portion of the glue board separate from the first and second portions.

2. The insect trap of claim 1, wherein each of the first and second light sources is located a greater distance away from the glue board receiving space, along a direction substantially parallel to an optical axis of the lens, than a front surface of the front element of the lens.

3. The insect trap of claim 1, further comprising a surface located inside the housing, wherein the surface faces the glue board receiving space, and wherein the lens of the camera is mounted in an opening in the surface.

4. The insect trap of claim 3, wherein said surface located inside the housing is a surface of an enclosure containing said camera and one or more further electronic components of the insect trap, and wherein the first and second light sources are located outside said enclosure.

5. The insect trap of claim 1, wherein the glue board receiving space substantially fills a field of view of the camera.

6. The insect trap of claim 1, wherein an optical axis of the lens is oriented substantially parallel to a surface normal of the glue board when the glue board is received in the glue board receiving space.

7. The insect trap of claim 1, wherein a distance between a front surface of the front element and the glue board receiving space, along an optical axis of the lens, is in the range 50 mm≤d≤200 mm.

8. The insect trap of claim 1, wherein the lens has a focal length in the range 2 mm≤f≤12 mm.

9. The insect trap of claim 1, wherein the lens is a fisheye lens.

10. The insect trap of claim 1, wherein each of the first and second light sources comprises a fluorescent tube.

11. The insect trap of claim 10, wherein a longitudinal axis of each fluorescent tube is oriented substantially parallel to a plane containing the glue board receiving space.

12. The insect trap of claim 1, wherein each of the first and second light sources comprises a light emitting diode.

13. The insect trap of claim 1, wherein one or more surfaces located inside the housing are anti-reflective surfaces.

14. The insect trap of claim 1, wherein each of the first and second light sources is configured to emit ultraviolet light having a peak wavelength of around 368 nm.

15. A method of using an insect trap comprising:
providing a housing including a glue board receiving space located inside the housing;
providing a first light source and a second light source for attracting insects into the housing;
placing a glue board in the glue board receiving space;
providing a camera having a lens with a focal length in the range $1\ mm \leq f \leq 18\ mm$, the lens having a front element, wherein the camera is positioned to capture images of the glue board when the glue board is received in the glue board receiving space, wherein the light received by the lens of the camera for capturing images of the glue board comprises light from the first and second light sources reflected from the glue board,
wherein there is no line of sight between the first and second light sources and the front element of the lens, for preventing light from the one or more light sources from reaching the front element directly,
wherein the first light source is configured to illuminate a first portion of the glue board, the second light source is configured to illuminate a second portion of the glue board separate from the first portion, and the first and second light sources are configured to simultaneously illuminate a third portion of the glue board separate from the first and second portions;
using an image captured by the camera to determine that the glue board received in the glue board receiving space needs to be replaced; and
replacing the glue board.

* * * * *